United States Patent
Ramirez

(10) Patent No.: US 7,176,426 B2
(45) Date of Patent: Feb. 13, 2007

(54) INTEGRATED MICROWAVEABLE HEAT STORAGE DEVICE

(76) Inventor: Juan José Ramirez, 10637 Edgemere, Apt. E6, El Paso, TX (US) 79925

( * ) Notice: Subject to any disclaimer, the term of this patent is extended or adjusted under 35 U.S.C. 154(b) by 0 days.

(21) Appl. No.: 11/248,713

(22) Filed: Oct. 12, 2005

(65) Prior Publication Data

US 2006/0219712 A1    Oct. 5, 2006

Related U.S. Application Data

(60) Provisional application No. 60/663,052, filed on Mar. 18, 2005.

(51) Int. Cl.
*H05B 6/80*     (2006.01)

(52) U.S. Cl. .................. 219/730; 219/732; 219/762; 99/DIG. 14; 126/246; 126/275.1; 426/241

(58) Field of Classification Search ........ 219/725–735, 219/759, 762; 99/DIG. 14; 126/375.1, 390, 126/400, 246; 426/107, 234, 241, 243
See application file for complete search history.

(56) References Cited

U.S. PATENT DOCUMENTS

| | | | |
|---|---|---|---|
| 2,545,733 A | | 3/1951 | Hatfield |
| 3,065,744 A | * | 11/1962 | Scavullo ............... 126/246 |
| 3,734,077 A | | 5/1973 | Murdough |
| 3,837,330 A | | 9/1974 | Lanigan |
| 3,916,872 A | | 11/1975 | Kreis |
| 4,143,647 A | | 3/1979 | Huslein |
| 4,246,884 A | | 1/1981 | Vandas |
| 4,258,695 A | * | 3/1981 | McCarton et al. .......... 126/246 |
| 4,505,252 A | | 3/1985 | Wada et al. |
| 4,567,877 A | | 2/1986 | Sepahpur |
| 4,743,726 A | | 5/1988 | Hughes |
| 4,817,704 A | | 4/1989 | Yamashita |
| 4,933,534 A | | 6/1990 | Cunningham et al. |
| 4,982,722 A | | 1/1991 | Wyatt |
| 4,983,798 A | | 1/1991 | Eckler |
| 5,052,369 A | | 10/1991 | Johnson |
| 5,107,087 A | * | 4/1992 | Yamada et al. ............. 219/730 |
| 5,125,391 A | | 6/1992 | Srivastava |
| 5,598,946 A | | 2/1997 | Davis |
| 5,884,006 A | | 3/1999 | Frohlich |
| 6,147,337 A | * | 11/2000 | Besser ..................... 219/730 |
| 6,188,053 B1 | | 2/2001 | Wyatt |
| 2002/0096514 A1 | | 7/2002 | Johnson |
| 2005/0051543 A1 | * | 3/2005 | Isogai et al. ............... 219/762 |

FOREIGN PATENT DOCUMENTS

| | | |
|---|---|---|
| EP | 0072337 | 2/1983 |
| GB | 170700 | 11/1921 |

* cited by examiner

*Primary Examiner*—Philip H. Leung

(57) ABSTRACT

An integrated microwaveable heat storage device that absorbs substantial amounts of microwave energy in a microwave oven in a relatively short period of time (one to 2 minutes) and releases this energy as heat (infrared radiation) over an extended period of time (typically 20 to 30 minutes The device includes three rigid elements, the upper element usually in the form of a container (10) such as a dish or cup cooperating with a base (14) to form a sealed enclosure or cavity. This enclosure is transparent to microwaves and encloses a mass of solid microwave absorbing material heater (12) in minimum contact with the walls of the cavity. This receptacle (enclosure) and the microwave absorbing material (the heater (12)) can have different cross sections, shapes, volumes and masses according to the specific intended use of the heat-storage device.

7 Claims, 15 Drawing Sheets

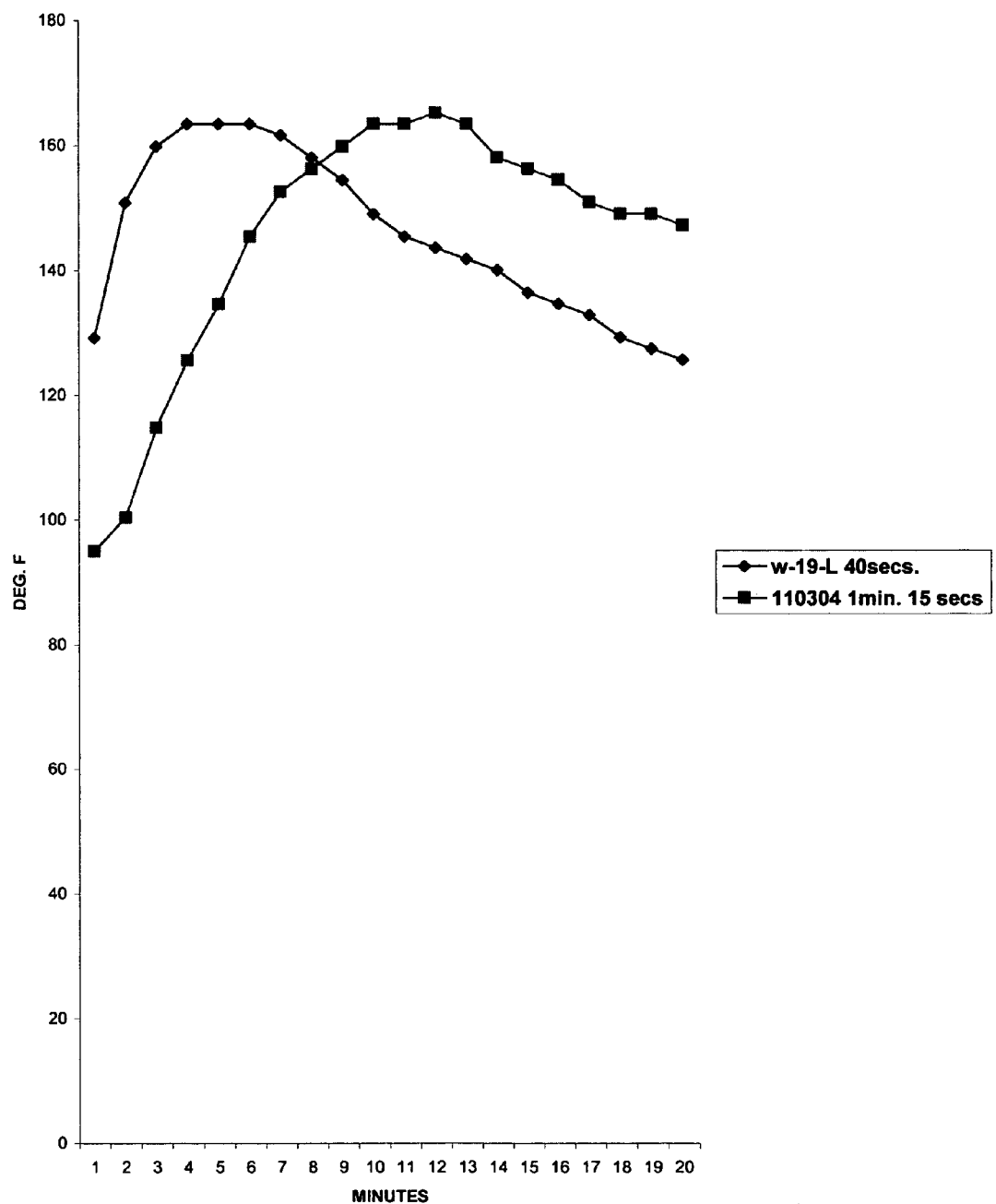

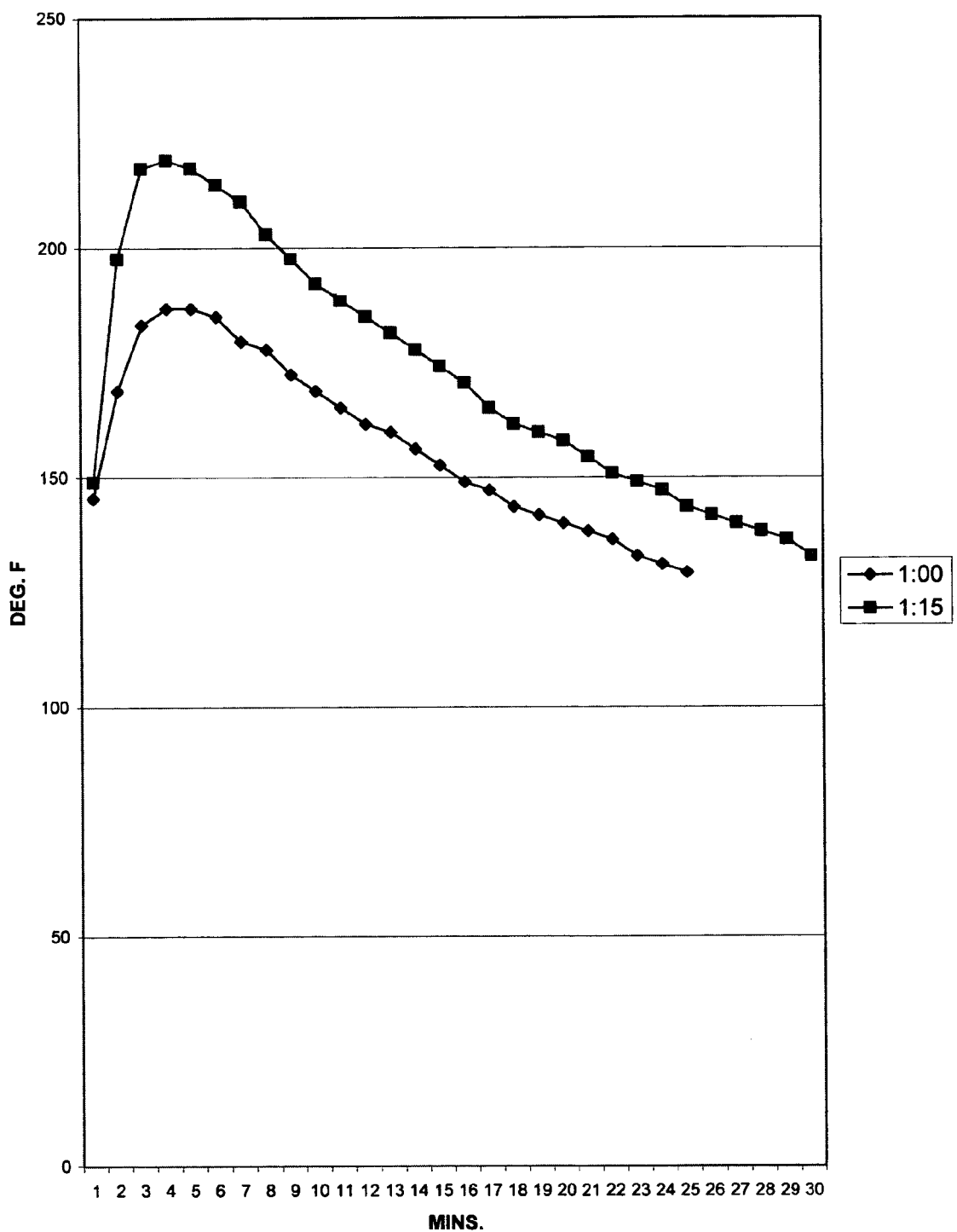

INTEGRATED MICROWAVEABLE HEAT STORAGE DEVICE

RELATED APPLICATIONS

The present application is a continuation-in-part application of U.S. provisional patent application, Ser. No. 60/663,052, filed Mar. 18, 2005, by Juan J. Ramirez, included by reference herein and for which benefit of the priority date is hereby claimed.

FIELD OF THE INVENTION

The present invention relates to Heat Storage Devices and, more particularly to Heat Storage devices that absorb microwave energy, store it as heat and can be integrated to ceramic containers such as dishes, bowls, coffee mugs, etc.

BACKGROUND OF THE INVENTION

Ever since tableware was invented, there has been a need to keep food warm after being served, this is not only true for the food that is served on dishes (plates) which are practically impossible to insulate, but also other foodstuffs such as bread, tortillas, beverages, etc.

This need is specially noticed in restaurants, hospitals, etc. where it takes a relatively long period time between the time the food is served and the time the food is delivered and consumed.

At home this need to keep food hot is most apparent in cold climate places. In warm places this need may be overlooked because of the paradigm that there is no practical or easy solution to the problem but the enjoyment of eating is definitely increased when the food is eaten slowly at the appropriate temperature getting satisfied by eating less food while socializing with family or friends.

In restaurants they try to solve the problem by pre-heating the dishes (plates), and in some steak restaurants they use metal skillets with a wooden base.

In hospitals they use expensive and complicated carriers (plate warmers or bases with covers), but as soon as the cover is taken off the food cools down rapidly.

At home very few people attempt to solve the problem, there is a paradigm that no practical solution exists, some people preheat the plates on special occasions, but the handling of hot dishes is complicated and cumbersome and they do not stay hot for very long.

The pre-heated dishes in restaurants do not stay hot for very long and have to be handled with mittens or some form of protection to avoid burns because the rim also gets very hot. The skillets have a very limited use (almost only for steaks), they have to be heated to a very high temperature and they lose the heat very fast, they are also very expensive and impractical for use at home.

My heat storage device incorporated in the design of a dish (plate) is a more elegant, efficient and above all less expensive solution than skillets for steaks. It does not need to be over heated and it releases its thermal energy at a controlled rate The carriers used in hospitals are only effective until the cover is removed, after that, the food cools down. They are not practical for use at home or at restaurants U.S. Pat. No. 6,188,053 by Wyatt shows a Heat retentive server this server (not a dish) is complex, even has a pressure relief valve, it is not practical for use in restaurants or at home U.S. Pat. No. 4,246,884 by Vandas is a plate warmer (not a plate or dish) which is not practical for restaurants or for use at home, its temperature v. time chart shows that it needs to be heated at a very high temperature and the temperature declines very fast with time. My heat storage device incorporated into the design of a plate needs to be heated typically for only one minute in a 1200 Watts microwave oven, reaches a temperature of only about 200 degrees Fahrenheit, but still ends up with a temperature of about 140 degrees Fahrenheit after 20 to 25 minutes due to its controlled heat release rate (if preheated just 1:15 minutes, it stays hot for half an hour (140 degrees Fahrenheit after 30 minutes). A delay action is incorporated in the design to avoid over heating the food. This delay action can be specified as wished within a certain extent according to the particular purpose of the dish (steak, pasta, general purpose, etc.).

U.S. Pat. No. 2,545,733 by Hatfield is a water filled child dish, it is only practical for children and has to be refilled with hot water every time it is used, its use is very specific, not suitable for adults.

U.S. Application publication 2002/0096514A1 by Johnson shows a heat retaining microwaveable dish very complicated with too many components (even includes a filling spout of which no details are shown), this dish could be even dangerous if water is used as the heat retaining medium. Independently of which retaining medium is used, food may fall in the holes causing serious hygienic problems. My version of a heat retaining dish has only three elements including a rigid microwave absorbing heater(or heat retaining medium).

U.S. Pat. No. 5,052,369 by Johnson shows another heat retaining food container. There are a few more of these type of containers (not plates or dishes) but none of these inventions have the advantage of my heat storage device which is: microwaveable, efficient (absorbs energy fast and releases it at a controlled rate) and can be integrated (or incorporated) into the design of ceramic dishes, bowls, coffee mugs, etc.

In conclusion: while it is evident that the problem exists and there is a real need for a solution to this problem: Most of these inventions which attempt to solve the problem are very complicated and expensive, and none of them seem to be designed for use at home. My heat storage device incorporated to a dish can be handled normally by the rim which remains cool, and can be used at home on a regular basis. It is normally preheated only 1 to 1:15 minutes (my preferred embodiment is designed for just one minute preheating time), and this is normally enough, it stays hot for 20 to 30 minutes (Approximately 140 degrees Fahrenheit temperature after this elapsed time).

My integrated microwaveable heat storage device although my preferred embodiment is as a heat storing plate (dish), is not limited to the application on just dishes, but it has many other applications as shown below.

It is therefore an object of the invention to provide an easy to use microwaveable heat storage device that can either be used as an integral part of dishes, bowls, coffee mugs etc or independently. and also be used in other different applications (such as tortilla warmers, pizza delivery, etc.), mainly to keep food warm after being served or transported, in different sizes, masses predetermined cross-sectional shapes and forms according to the particular use required, It is another object of the invention to absorb a relatively high amount of energy in a very short time (typically 1 to 1.5 minutes for a dish) and store it as heat in a rigid non-toxic heater with enough predetermined thermal mass in order to maintain food hot after being served and while it is delivered and consumed It is another object of the invention to maintain the food warm by releasing the heat with a delayed action, at a controlled heat transfer rate and within a certain range of temperature without overheating it. This delayed action can be controlled mainly by varying internal dimensions such as the gap between the heater and the container (dish bowl, mug, etc.) which at present I prefer to be of the order of 2 to 4 millimeters for a dish.

It is another object of the invention to be applied in a multipurpose heat storage dish or plate (which is my preferred embodiment and one of the main practical applications of the heat-storage device) in which enough and predetermined thermal energy is stored without reaching very high temperatures (only about 200 degrees Fahrenheit) to allow enjoyment of the food and that can be safely handled by the rim which remains cool.

These are some of the unique features of this dish:

1) Absorbing a sufficient predetermined energy in a relatively short period of time (1 to 1:30 minutes, typically one minute.

2) Reaching maximum temperature on the surface several minutes after (and this is very important) removing it from the oven (delay action).

3) Releasing this heat at a controlled rate

4) And very important, the rim stays cool during this whole process allowing for safe handling.

It is another very important object of the invention to provide a dish with all of the advantages shown above at a low cost and for use at home regularly in a practical and easy way in order to improve eating habits, such as eating slowly, enjoying the food and getting satisfied by consuming less food (it is a well known fact that overeating is a real problem in our present society).

It is another object of the invention to provide a dish of choice (or favorite), a coffee mug of choice, etc. for the members of the family, since according to tests performed, the enjoyment of eating is increased, The family members tend to grow fond of this type of dish.

And finally, when the best of the cuisine (or style of cooking) is prepared and the recipe can not be improved, the quality of service still can be improved by serving the food in a dish that maintains the food at the ideal temperature in a very innovative manner

SUMMARY OF THE INVENTION

In accordance with the present invention, there is provided an integrated (incorporated to the design) microwaveable heat storage device that absorbs a predetermined amount of high frequency electromagnetic radiation such as the microwaves in a common microwave oven in a relatively short period of time (typically one to 1.5 minutes in a 1200 watt oven for an 11 inch diameter dish) and releases this energy as heat (infrared radiation) over an extended period of time (typically 25 to 30 minutes or more).

The device consists of a rigid container and a rigid hollow base both transparent to microwaves joined to form an hermetically sealed cavity enclosing a solid mass of microwave absorbing material specially developed for this purpose (the heater), this heater is in minimum physical contact with the internal walls of the cavity. This container, the microwave absorbing material (the heater) and the base can have different predetermined cross-sectional shapes, volumes and masses according to the specific intended use of the Integrated heat-storage device.

This heat storage device can be used by itself or integrated into the design of dishes, bowls, coffee mugs, etc. at a low cost instead of using complicated and expensive devices such as dish carriers (with their corresponding covers) or thermos bottles that are not suitable for use in restaurants, hospitals or at home.

The heat storage device is preheated in a microwave oven for a predetermined and relatively short period of time (1 to 1.5 minutes) and releases this thermal energy at a controlled rate to maintain foodstuffs and beverages warm on the table.

BRIEF DESCRIPTION OF THE DRAWINGS

A complete understanding of the present invention may be obtained by reference to the accompanying drawings, when considered in conjunction with the subsequent, detailed description, in which:

FIG. 11 is a temperature chart view of a time v. temperature chart comparing two different dishes with different delay actions; and FIG. 12 is a time vs. temperature chart view of a typical time v. temperature chart showing a comparison of the same dish preheated one minute, and preheated one minute and 15 seconds (75 seconds).

For purposes of clarity and brevity, like elements and components will bear the same designations and numbering throughout the Figures.

DESCRIPTION OF THE PREFERRED EMBODIMENT

Integrated Microwaveable Heat Storage Device

The name is derived from the fact that this heat storage device can be integrated or incorporated into the design of ceramic tableware such as plates, coffee mugs (cups), bowls etc. for the purpose of keeping food and beverages warm after being served, however this heat storage device can have several uses by building it in different shapes, sizes, thermal masses etc.

Figure 1:
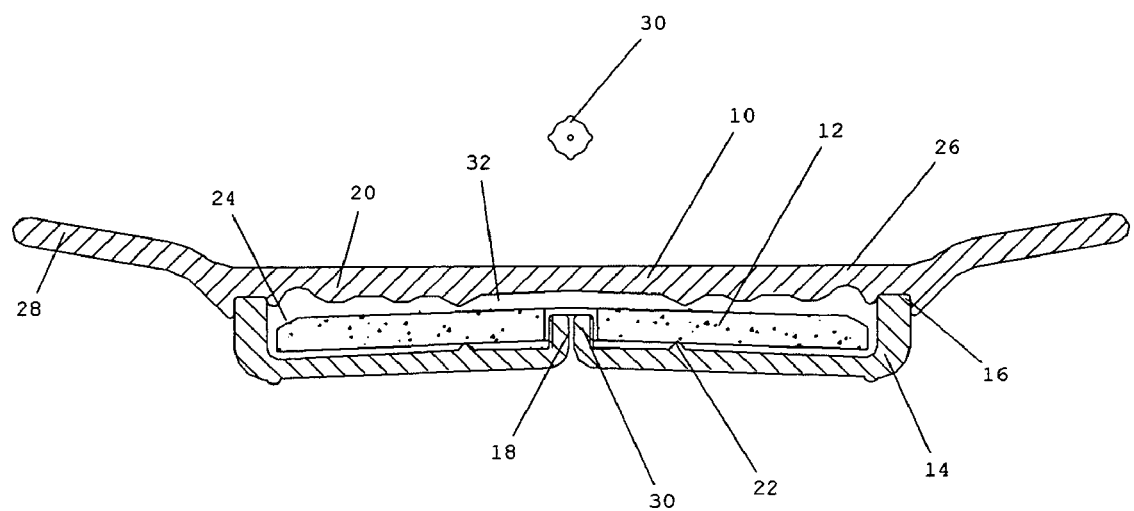
FIG. 1 is a front sectional view of an integrated microwaveable heat storage device, preferred embodiment shows it integrated into the design of a heat storage dish or plate, it shows a disk of microwave absorbing material (the heater) enclosed in a sealed cavity.
Figure 1A:
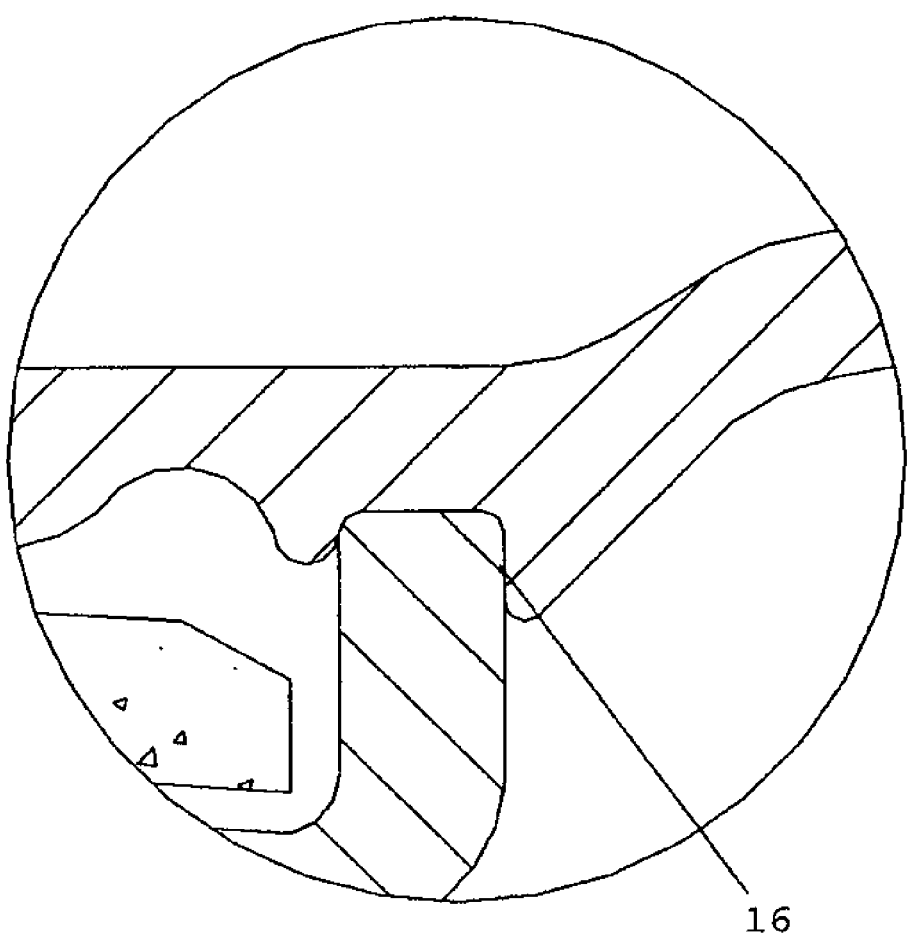
FIG. 1A is a front sectional view of a detail of joint of FIG. 1.

THE MHSD.—The microwaveable heat-storage device (MHSD) See FIGS. 1 (Preferred embodiment) and 1A (Detail of the joint) when integrated or incorporated to the design of tableware in general consists of a mass of microwave absorbing material or Heater 12 enclosed in a cavity formed by two rigid, transparent to microwave elements and in minimum physical contact with the walls of this elements. The Container 10 or upper element's function is to contain the food or beverage, the lower element functions as a Base 14, both elements have a predetermined cross-sectional shape designed to enclose the Heater 12 while making minimum physical contact with it. this is attained by pointed shaped bosses in the downside of the Container 10 (optional) and upper side the Base 14. (the walls of the cavity that encloses the heater 12)

FIG. 1 CERAMIC HEAT STORAGE PLATE OR DISH.—is a cross sectional view of a ceramic heat storage dish or plate with the MHSD integrated in its design which is my preferred embodiment and one of the main applications of the microwaveable heat storage device (MHSD)

This dish can be pre-heated for as little as 1 to 1.5 minutes in a 1200 Watt microwave oven and stays hot for 20, 30 minutes or more. The temperature on the surface of an empty dish rises to about 200 degrees Fahrenheit and gradually releases heat, the surface of the dish still remains at about 140 degrees Fahrenheit after that time and during all this time, the Rim 28 remains cool. The dish can be handled without gloves or any protection for the hands.

THE Container 10.—The dish shaped Container 10 cooperates with the Base 14 to form the sealed Cavity that contains or encloses the heater 12 (or microwave absorbing material), it has several bosses (optional) in the lower side to restrict the movement of the Heater 12, it is not in physical contact with the Heater 12,. I presently prefer the container 10 and the base 14 to be made out of stoneware but other types of ceramics and even heat resistant (thermal shock resistant) glass can be used There is a small gap 32 (about 1 millimeter) between the bosses on the underside of the container 10 and the Heater 12 to allow for expansion or thermal deformation, I presently prefer the gap 32 to be of the order of one to two millimeters approximately. The gap 32 is also one of the main factors to control the heat release rate and delay action.

This dish shaped Container 10 is used to contain the food and I presently prefer the thickness to be of 6 to 10 mm. approximately (thicker if more thermal mass is required, Also the thickness needs not to be uniform, it can be increased towards the Rim 28, to resist the thermal stresses generated in the center of the dish by the heat. The cross-section of this Container 10 may contain concentric reinforcements 20 for structural reinforcement and constrictions to limit the flow of heat towards the rim 28 by conduction as wished, this is optional THE Heater 12.—The microwave absorbing material or Heater 12 is a "new composition of material" specially developed by me for this heat storage device and it is an homogenous mixture of red earthenware (stoneware and other ceramics can also be used) with a small percentage of iron filings or particles (other metals, metal oxides, polar molecules and in general any material capable of being excited in a variable electromagnetic field can be used), it is basically a disk with a hole 18 in the center. The mixture of red earthenware and iron filings is let to dry as it is done with any pottery article and then fired in a kiln at the recommended cone temperature for the red earthenware (or ceramic used) in order to form a solid disk that has the ability to both absorb microwave energy and store it as heat.

This Heater 12 has a predetermined mass and dimensions to contain enough thermal mass to keep the dish hot for approximately 20 to 30 minutes (140 degrees Fahrenheit approximately after this time or as wished) being pre-heated for as little as only one to two minutes in a 1200 Watt oven (normally one minute is enough).

I presently prefer this Heater 12 to have the following characteristics:

disk shaped with a hole 18 in the middle, 11.11% content of iron filings by volume, these iron filings of an average size between 0.5 to 1.5 millimeters (I obtained my iron filings in a brake shop where they are usually discarded as scrap), the disk of 8 to 10 millimeters of thickness, 145 millimeters of outside diameter, the hole 18 in the center of 10 to 12 millimeters. optionally this Heater 12 can be convex in the upper side, in order to create a thermal gradient in the Dish shaped Container 10 and eliminate the risk of cracking due to thermal shock.

Optionally too, the gap 32 between the Dish shaped Container 10 and the Heater 12 can be increased also to minimize the risk of thermal shock. I presently prefer this gap 32 to be of a minimum of 3 millimeters if the Heater 12 is flat (and 1 millimeter in the center and 4 millimeters in the extreme if the Heater 12 is convex) but these gaps can be specified according to the results desired such as maximum temperature desired, the time to reach this temperature or delay time, and the time one desires the dish to stay hot.

THE Base 14.—The Base 14 has basically a cylindrical inner shape and is made of ceramic transparent to microwaves of the same type as the material used for the Container 10, it has a cylindrical centering boss with a diameter smaller than that of the hole 18 in the Heater 12 in the middle with a venting and sealing hole 18 of approximately 1 to 2 millimeters of diameter through it, the function of the Base 14 is to cooperate with the Dish shaped lid to form a sealed cavity and enclose the Heater 12 while making minimum physical contact with it and to serve as a stable support for the heat storage dish (optionally the container 10 and the base 14 can be made out of thermal shock resistant glass or ceramic).

The centering boss 30 (of about 10 millimeters in diameter) centers the Heater 12 the vertical ribs are optional and their purpose is to keep minimum physical contact with the Heater 12 The venting and sealing hole 18 allows gases and hot air to escape during the sealing process at high temperature in a kiln in order to get a perfect sealing between the Dish shaped Container 10 and the Base 14, In a later phase of the fabrication process this venting and sealing hole 18 is sealed with high-temperature water-resistant sealers such as silicone after pre-heating the dish at a temperature higher than its temperature of operation in order to create a semi vacuum inside the cavity.

The Base 14 in its inner part also has several pointed bosses 22 to bear the Heater 12 in order to maintain minimum physical contact with it, this Supporting bosses are closer to the center to minimize heat losses by conduction. In this embodiment, the Base 14 has a concave lower side to create a separation between the dish and the table on which it rests (not shown), it also has a dry foot as normal dishes have in order to keep the dish from sticking to the kiln furniture (the dry foot is a circular ring in the underside of a dish of a dish not covered by glaze).

The Constriction 26 near the joint is optional and is included to minimize heat loses by conduction to the Rim 28.

THE Seal 16.—The Seal 16 is done at high temperature using glaze or glaze thickened with ceramic dust (previously burned). My preferred method at present is to simply join temporarily in three or more places the Container 10 and the Base 14 (with the heater 12 inside) in a bisque fired state with an adhesive such as epoxy resin, and glaze the dish by any of the well known methods (Immersion, spraying, brushing, pouring, etc.) and then fire it in a kiln at the appropriate cone temperature for the glaze, this way the dish is glazed and the container 10 and base 14 are sealed together at the same time (any hot gases will escape by the hole 18).

Alternatively high-temperature water-resistant sealers or adhesives such as silicone, urethane or the like may be used to join the container 10 and the base 14 and to close the hole 18.

The ramp 24 in the Heater 12 is optional, and is used to create a transition zone between the hot and cool zones (or Rim 28) of the dish.

The center thickness of the plate or container 10 can be smaller to save a couple millimeters in height if the Heater 12 is convex, this is optional.

The concentric ribs or reinforcements give resistance to thermal shock, are also optional.

The base 14 can have also concentric and/or radial reinforcements (optional).

After the sealing process is done, the dish is pre-heated at a higher temperature than the temperature of operation (the temperature at which it will be used) and the venting and sealing hole 18 is closed using high-temperature, water-resistant sealer of the kind used to form gaskets in motors, urethane or something similar, forming a semi-vacuum in the cavity. This sealing of the hole 18 at high temperature will prevent the heat storage device from bursting due to the pressure that the air inside would develop when heated. This is in accordance with the laws of Charles and Boyle that state that a gas as the air will develop a pressure proportional to its absolute temperature in degrees Kelvin (in this case the volume is constant since it is a sealed cavity).

Figure 2:
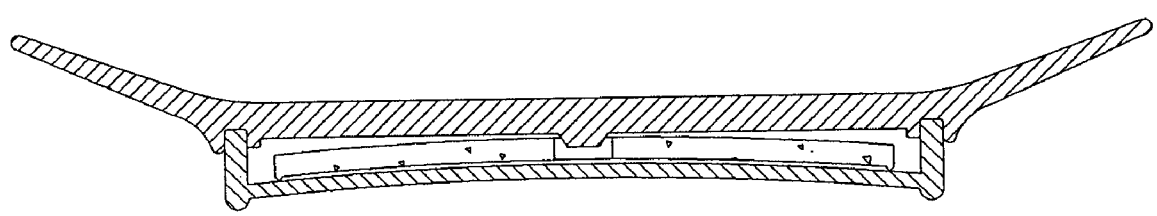
FIG. 2 is a front sectional view of a heat storage dish with a thick container, convex heater and concave base.
Figure 3:
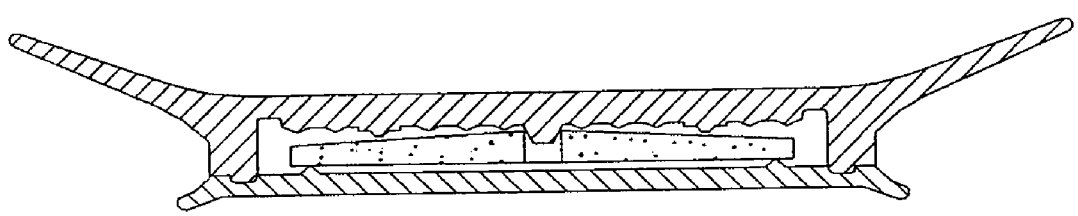
FIG. 3 is a front sectional view of a heat storage dish with convex heater and a tall dry foot (novel design)

FIG. 2 shows another embodiment with a relatively thick upper component for thermal mass, the Heater 12 is convex to create a thermal gradient FIG. 3 shows eat storage dish in which the a Heater 12 has a slope to create thermal gradient, the dry foot is higher, the design or external appearance of the dish is very novel, this design allows for a Heater 12 with a very large thermal mass, the time it remains hot can easily exceed half an hour, very appropriate for steaks.

Figure 4:
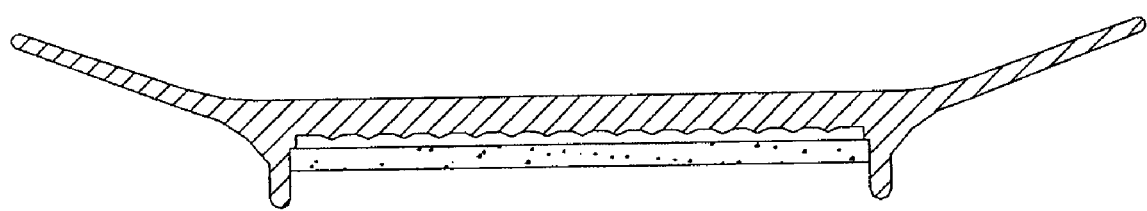
FIG. 4 is a bottom sectional view of a hot dish, a simpler alternative with only two elements, it still has a delay action.

FIG. 4 hot dish, A simpler alternative of just two elements. It still provides a delayed action (the surface of the dish reaches its maximum temperature several minutes after being taken out of the microwave oven.

Figure 5:
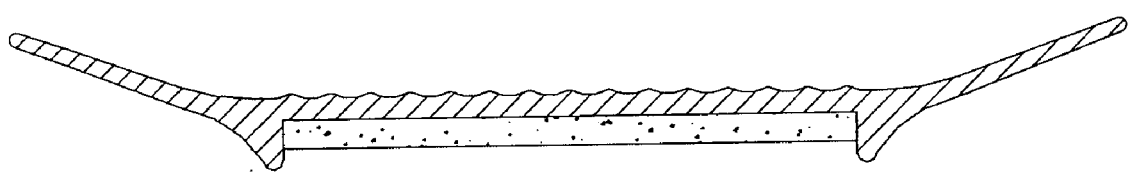
FIG. 5 is a front sectional view of a hot dish with heater conjoined with the container.

FIG. 5 Hot dish, with the Heater 12 in contact with the Container 10. still a simpler embodiment, it simply relies on the microwave absorbing characteristics of the Heater 12 and the thermal mass of the assembly, it is a less expensive alternative but less efficient.

Figure 6:
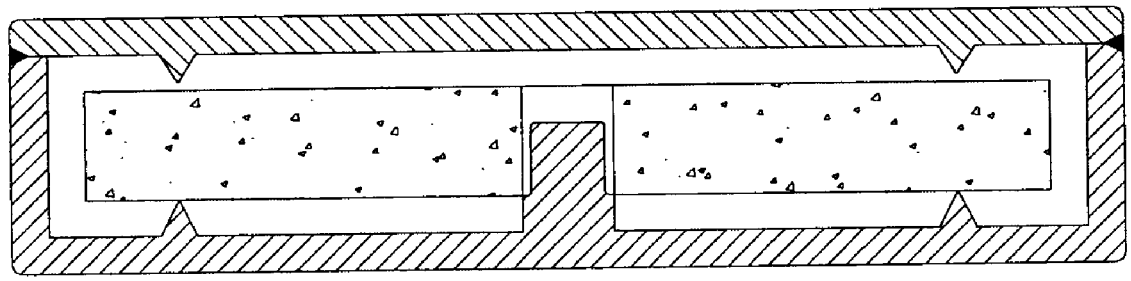
FIG. 6 is a front sectional view of a heat storage device for use in tortilla warmers or pizza delivery (one of the simplest embodiments)

FIG. 6 microwave energy absorbing heat-storage device in a configuration or embodiment appropriate for tortilla warmers or pizza delivery, the size (and mass) can be specified according to the application. It is designed to be used in conjunction with a common plastic tortilla warmer or to be put inside a pizza delivery bag.

Figure 6A:
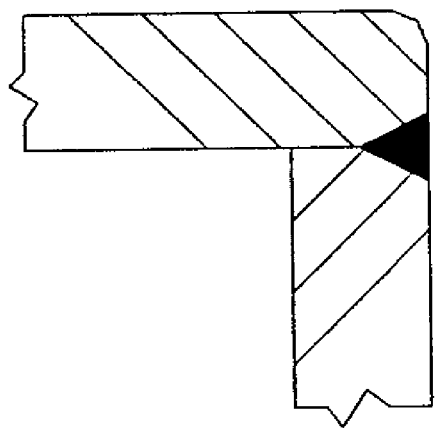
FIG. 6A is a front sectional view of a detail of joint of a heat storage device.

FIG. 6A is a detail of the joint which can be formed with glaze or adhesives

Figure 6B:
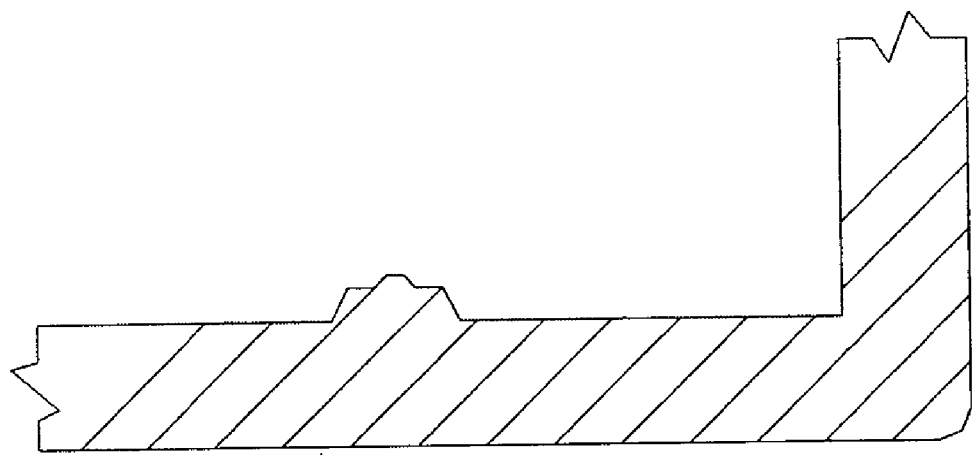
FIG. 6B is a front sectional view of a different configuration of boss for minimal physical contact.

FIG. 6B Different configuration of boss for minimal physical contact

How to Use the Microwaveable Heat Storage Dish,

1) Preheat in a microwave oven for the time specified (normaly one minute, it varies according to the size and type of dish (general purpose, steak dish, pasta dish, etc.) and serve the food hot and it will remain hot for a significantly longer time than in a normal dish (this depends of many factors such as the type, temperature, and amount of food served.

2) Food can be heated on this type of dish using a low power setting (10 or 20%) and checking periodically to avoid overcooking the food.

How to Use the Cup or Bowl:

Just preheat for the time specified (the procedure is similar as in plates or dishes).

How to Use for Tortilla Warming:

When used for tortilla warming, this heat storage device of a predetermined size (FIG. 6) is simply put inside the plastic tortilla warmer, the tortillas are wrapped in a piece of cloth as it is normally done, placed over the heat storage device and heated in the microwave oven with the plastic cap of the tortilla warmer removed. Heating up everything and allowing one extra minute heating for the heat storage device. by doing this the tortillas will be hot and the need for trips to the kitchen to heat up more tortillas is greatly reduced.

How to Use for Pizza Delivery:

When used for pizza delivery, a heat storage device of a predetermined size is pre-heated in a microwave oven and put inside the pizza delivery bag or inside a pizza box in the delivery bag.

This heat storage device or the Heater 12 itself can also be used as a heating element for any microwave based house heating system. The shape and percentage of iron filings can be varied accordingly.

Figure 7:
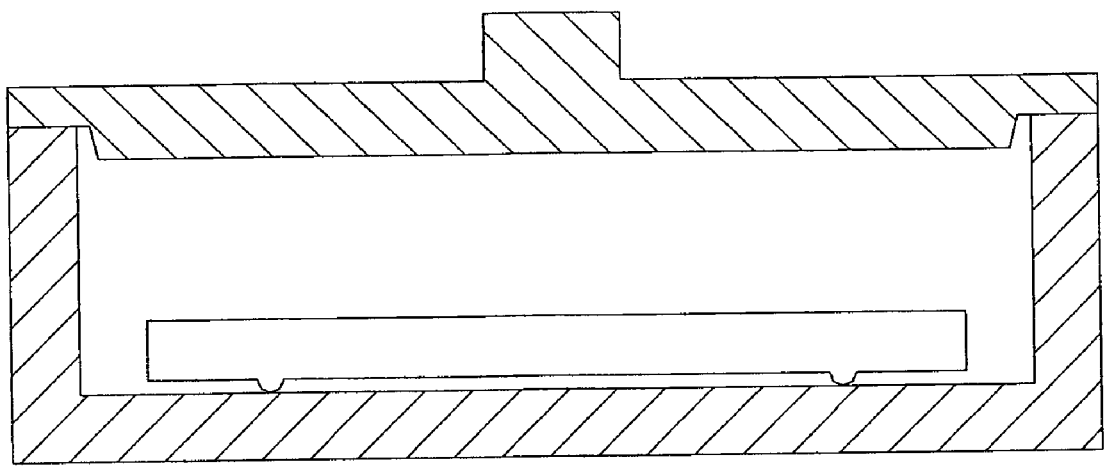
FIG. 7 is a cross section view of a microwaveable heat storage device inside a regular plastic tortilla warmer.

FIG. 7 Heat storage device of the kind shown in FIG. 6 used inside a common plastic tortilla warmer (the heat storage device has bosses in its underside for efficiency and to avoid melting the plastic in case of over heating.

Figure 8:
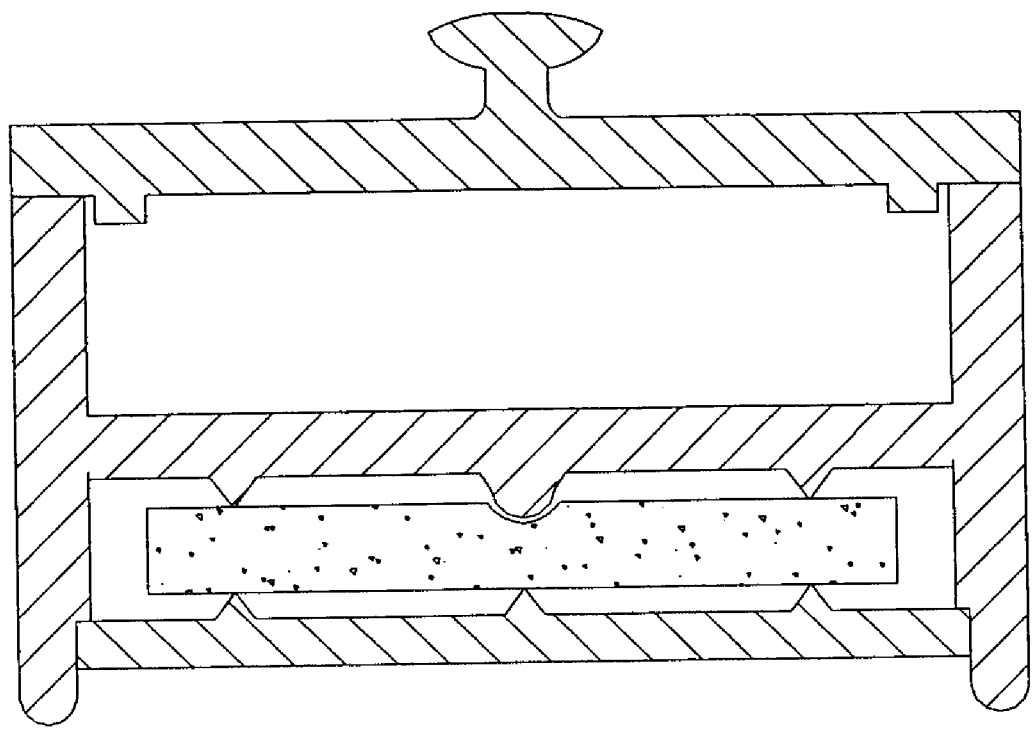
FIG. 8 is a front sectional view of a cross-section of an all ceramic tortilla warmer, (heat storage device integrated or incorporated in the design)
Figure 9:
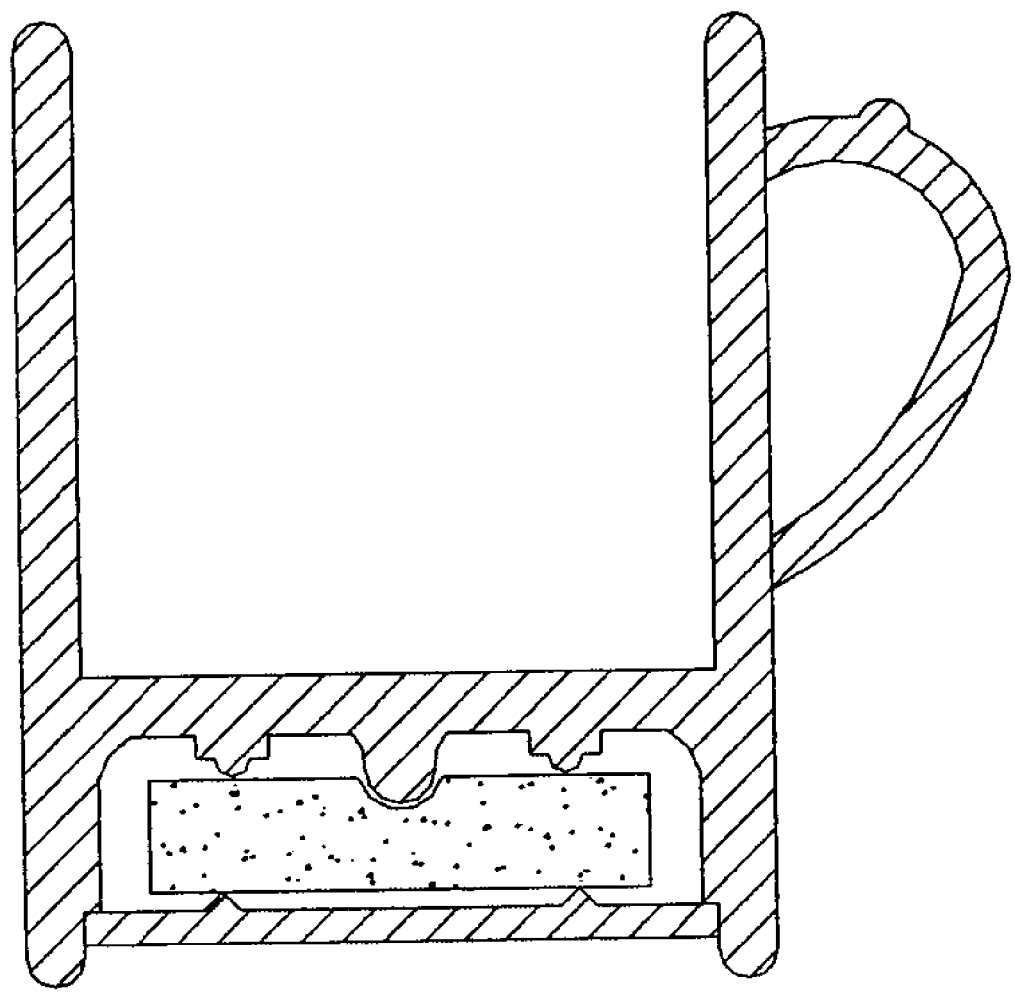
FIG. 9 is a front sectional view of a heat storage coffee mug (again, heat storage device is integrated)

FIG. 8 Shows a cross-section of an all ceramic tortilla warmer, the MHSD is integrated into its design FIG. 9 Cross section of a heat storage coffee mug, a relatively big delay time can be specified to avoid overheating the coffee, but drinking up to the last remnant at a nice temperature. It is mainly conceived to enjoy the first cup of coffee at home (although can be used also in any place where a microwave oven is available such as businesses, offices, etc.), maintaining the coffee hot for an extended period of time.

Figure 10:
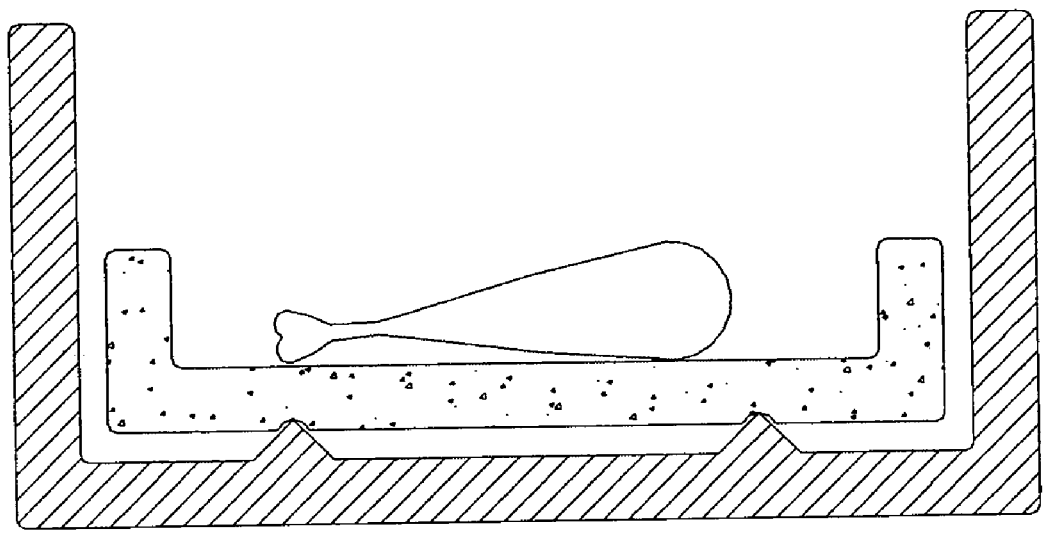
FIG. 10 is a front sectional view of an application of the heater for roasting or browning.

FIG. 10 microwave absorbing Heater 12 being used for browning or scorching food. the cross section can be designed for browning pizzas, cookies etc. This very simplified view shows a piece of chicken but for better results the food has to make good contact with the surface of the Heater 12. This Heater 12 gives microwave ovens a new capability usually only available in very expensive and complicated models. The thickness of the Heater 12 and the percentage of iron filings can be specified to a precise balance so that food can be cooked taking advantage of the properties of a microwave oven (cooking food very efficiently from inside out using the excitation of polar molecules such as water and oils) and getting the taste and appearance obtained only on conventional ovens, that is browning or scorching.

FIG. 11 Time vs. Temperature chart comparing two different dishes one of them reaches its maximum temperature after 12 minutes approximately.(appropriate for pastas). This shows that different delay action times can be specified. they can also be designed for different maximum temperatures reached, Duration (or period that the dish remains hot), etc. The combinations are practically limitless and they are achieved by varying the mass of the Container 10, the gap 32 between the Container 10 and the Heater 12, the mass of the Heater 12, the percentage of iron filings in the Heater 12, the lower gap 32 (between the Heater 12 and the Base 14), the height of the dry foot and above all the heating time.

FIG. 12 Typical time v. temperature chart showing a comparison of the same dish preheated one minute, and preheated one minute and 15 seconds. Usually one minute is enough for the dish to remain and keep the food hot for eating normally. Note that the temperature on the surface of the dish keeps rising after taking the dish out of the microwave oven (delayed action), the shape of both curves is very similar, the temperature reached is very predictable, the time it takes to reach maximum temperature (delay action) is desirable this time and the angle of descent can be easily adjusted by changing the gap 32 and all the other parameters mentioned above.

Theory of Operation of the Microwaveable Heat Storage Device (MHSD)

The theory or principle of operation of this MHSD (see FIG. 6 which is a simple embodiment) can be applied to dishes, coffee mugs, bread warmers and other similar applications at home, in the industry etc. and could even have applications in heating systems etc. Also this MHSD can have different shapes such as a square prism, cube sphere etc.

The MHSD basically absorbs microwave energy very fast or in a very short time and releases infrared radiation or heat slowly in a controlled manner over a relatively long time.

The Heater 12 is a disk of ceramic and I prefer to use red earthenware which already contains some iron oxide or stoneware containing a pre-determined percentage of metal particles (I presently prefer iron filings and I prefer to use 11.11% by volume) and fired in a kiln at the recommended temperature for the clay (other types of clay can also be used), Each granule of iron is oxidized on the surface when mixed with the clay which contains water, and then is fired in an oxidizing atmosphere such as an electric kiln. The oxide is a polar molecule that gets excited by the microwaves and the core of each granule is electrically conductive. The microwaves induce currents in the core called eddy currents (similar to the parasitic currents in electric transformers where they are unwanted), these currents produce resistive heating.

The combined effect is that a lot of heat is produced in a very short time (similar to the heat produced in a short circuit). The Heater 12 absorbs electromagnetic energy of one frequency (microwaves), stores this energy as thermal energy (agitation of its molecules and cristals) and then emits electromagnetic energy of a different frequency (infrared)

While I believe the heating occurs by a combination of inductive heating, agitation of polar molecules and other parasitic currents, I do not wish to be bound by this.

One important thing to note here is that the heat produced in a unit of time is in direct relation to the quantity of metal particles or granules (iron filings in this case) in the Heater 12, so we have a Heater 12 that can be easily designed or suited to a particular application as desired, by changing the percentage of metal particles (iron filings). The mass of the Heater 12 also determines how much heat can be stored (thermal mass), and the time of heating or exposure which can be regulated very accurately by the controls of the microwave oven, give very predictable results in temperature reached and duration. The gaps between the Heater 12 and the walls of the cavity, also have a great effect on energy transfer rate from the Heater 12 to the walls, this energy transfer is in inverse relation to the square of the distance between the Heater 12 and the walls or gap 32 (small variations in gap 32 have large effects on energy transfer rate. Heat loss by convection (movement of hot air) is also minimized since the MHSD is sealed at a high temperature, so the air trapped inside is actually a semi-vacuum. This also avoids the possibility of bursting due to the pressure of hot air. According to the laws of Charles and Boyle in order for the air inside to surpass atmospheric pressure, the heat storage device or dish would need to be heated at an absolute temperature higher at which it was sealed (other heat storage serving devices even include a pressure release valve to avoid this problem).

Conclusion, Ramifications and Scope of Invention:

Thus the reader will see that the microwaveable heat storage device (MHSD) has many potential applications, either used by itself in different shapes, sizes, etc. or incorporated (integrated) to the design of tableware. also the Heater 12 by itself has several potential applications as cooking implement that allows microwave ovens to expand their capabilities (such as scorching or browning), as a low cost susceptor (a material that absorbs microwaves and emits heat) or even as the heating core of a microwave home heating system.

An alternate embodiment for all of the embodiments mentioned above, may include the use of a predetermined quantity of a phase change material (PCM) in the cavity.

A PCM is a material that stores heat when it melts and releases heat when it freezes (or changes of phase).

These PCM's may consist of paraffins, hydrated salts etc. they melt with the heat of the Heater 12 and do this at a relative constant temperature.

This option is only possible when the Container 10 and Base 14 are sealed at low temperature using adhesives The PCM can be poured in in granular form through a hole 18 that is later sealed with a cap or plug, or a preformed disk of PCM can be sealed in the cavity along with the Heater 12 which in this case does not need to contain too much mass.

The MHSD can be used as the heating core of a microwave home heating system in combination with an insulated case, a magnetron, a fan, an air filter, a thermostat, electronic controls, software etc.

Another potential use is: to store massive amounts of thermal energy by installing a great number of these MHSD in a basement and heating them gradually at high temperatures by using solar energy by means of: photocell solar panels, an inverter (device for transforming direct current into alternating current), a magnetron, electronic controls, software etc.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A microwaveable heat storage device capable of being embodied alternatively as a plate, a bowl, a coffee mug, a tortilla warmer and other similar heat retentive tableware, comprising:

an upper microwave transparent container-shaped means including an outer rim or a handle on the container shaped means, which remains cool to allow handling, the container shaped means having a predetermined thermal mass and cross-section for providing a container for food and liquids in no physical contact and separated by a predetermined non-uniform gap from a means for absorbing microwave energy and emitting infrared radiation and cooperating with a lower means for providing a base to enclose said means for absorbing microwave energy in a relatively tight cavity;

an encapsulated of a predetermined mass and cross-sectional shape rigid means for absorbing microwave energy and emitting infrared radiation in no physical contact and separated by an irregular predetermined gap from said upper means for providing a container and in minimum physical contact with a lower means for providing a base;

a lower rigid, hollow shaped means for providing a microwave-transparent base for said device, cooperating with said means for providing a container to enclose said means for absorbing microwave energy in a relatively tight cavity in minimum physical contact and centering said means for absorbing microwave energy, and sealingly connected to said means for providing a container;

whereby said heat storage device embodied as a piece of dinnerware can be preheated in a microwave oven in typically one minute to maintain foodstuffs and liquids hot at the table.

2. The integrated microwaveable heat storage device in accordance with claim 1, wherein said means for providing a container for food and liquids comprises a rigid, of a predetermined absorption coefficient, thermal mass, and cross-sectional shape, heat resistant container.

3. The integrated microwaveable heat storage device in accordance with claim 1, wherein said means for absorbing microwave energy and emitting infrared radiation comprises a made of microwave-absorbing material, of a predetermined energy absorption capacity, emissivity, thermal mass and cross-sectional shape heater.

4. The integrated microwaveable heat storage device in accordance with claim 1, wherein said means for providing a base for the device assembly, and cooperating with the container to enclose said heater in minimum physical contact with said heater comprises a rigid, with a predetermined absorption coefficient, mass and hollow cross-sectional-shape, heat resistant base.

5. An integrated microwaveable heat storage device capable of being embodied alternatively as a plate, a coffee mug, a tortilla warmer and other similar heat retentive tableware, comprising:

a rigid, of a predetermined mass, container-shaped, transparent to microwaves, heat resistant container, for food and liquids in no physical contact and separated by a predetermined irregular gap from an encapsulated heater, said container including an outer rim or a handle on the container, which remains cool to allow handling;

a rigid, made of microwave-absorbing material, of a predetermined thermal mass and cross-sectional shape, heater, for absorbing microwave energy and emitting infrared radiation;

a rigid, with a predetermined mass and cross-sectional hollow shape, transparent to microwaves, heat-resistant base, for providing a base for the entire device, reflecting some infrared radiation and cooperating with said container to enclose said heater in minimum physical contact with said heater, and sealingly connected to said container; whereby said heat storage device embodied as a piece of dinnerware can be preheated in a microwave oven and said means for absorbing microwave energy will radiate infrared energy at a controlled rate in a confined space to maintain foodstuffs and liquids hot at the table while being consumed, with a delayed action which can be specified in minutes to avoid overheating the food.

6. The integrated microwaveable heat storage device as recited in claim 5, wherein said container has characteristics selected from the following group: made of ceramic, made of heat resistant glass, and made of heat resistant laminated glass.

7. The integrated microwaveable heat storage device as recited in claim 5, wherein said heater has characteristics selected from the following group: made of ceramic with metal particles, made of ceramic with polar molecules, and made of ceramic and a combination of metal particles and polar molecules.

* * * * *